US010347095B2

(12) United States Patent
Mattingly et al.

(10) Patent No.: US 10,347,095 B2
(45) Date of Patent: Jul. 9, 2019

(54) SYSTEMS AND METHODS OF TRACKING PRODUCTS DURING TRANSPORT

(71) Applicant: Walmart Apollo, LLC, Bentonville, AR (US)

(72) Inventors: Todd D. Mattingly, Bentonville, AR (US); Greg A. Bryan, Bentonville, AR (US); Benjamin D. Enssle, Bella Vista, AR (US); Cristy C. Brooks, Cassville, MO (US); David C. Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 12 days.

(21) Appl. No.: 15/792,455

(22) Filed: Oct. 24, 2017

(65) Prior Publication Data

US 2018/0114415 A1 Apr. 26, 2018

Related U.S. Application Data

(60) Provisional application No. 62/412,441, filed on Oct. 25, 2016.

(51) Int. Cl.
*G08B 7/02* (2006.01)
*G08B 21/18* (2006.01)
(Continued)

(52) U.S. Cl.
CPC ............. *G08B 7/02* (2013.01); *G08B 21/182* (2013.01); *H04Q 9/00* (2013.01); *G08B 23/00* (2013.01);
(Continued)

(58) Field of Classification Search
CPC combination set(s) only.
See application file for complete search history.

(56) References Cited

U.S. PATENT DOCUMENTS

| 4,239,434 | A | 12/1980 | Gannon |
| 4,495,434 | A * | 1/1985 | Diepers ................ G01L 1/146 310/338 |
| 4,509,123 | A | 4/1985 | Vereen |
| 7,066,389 | B2 | 6/2006 | Dickover |

(Continued)

OTHER PUBLICATIONS

Parrado, Patricia; "Internet of Things & Smart Pallets"; https://www.ennomotive.com/iot-smart-pallets/; Apr. 12, 2016; pp. 1-10.

(Continued)

*Primary Examiner* — Nabil H Syed
*Assistant Examiner* — Cal J Eustaquio
(74) *Attorney, Agent, or Firm* — Fitch, Even, Tabin & Flannery LLP

(57) ABSTRACT

In some embodiments, systems and methods are configured to track palletized products. Some embodiments comprise: a first array of sensors positioned relative to multiple products collectively arranged on a first transport pallet configured to support the multiple products while being transported; a wirelessly transceiver; and a pallet control circuit communicatively coupled with the wireless transceiver and the first array of sensors, wherein the pallet control circuit is configured to receive sensor data from one or more sensors of the first array of sensors, determine a condition of one or more products of the multiple products at least as the multiple products are transported based on the sensor data, and cause condition information to be wirelessly transmitted to a separate notification system configured to provide notification to a worker regarding the condition of the one or more products.

20 Claims, 3 Drawing Sheets

(51) Int. Cl.
   *H04Q 9/00* (2006.01)
   *G08B 23/00* (2006.01)
(52) U.S. Cl.
   CPC ..... *H04Q 2209/40* (2013.01); *H04Q 2209/86* (2013.01)

(56) References Cited

U.S. PATENT DOCUMENTS

| | | | |
|---|---|---|---|
| 7,085,677 | B1 | 8/2006 | Champlin |
| 9,245,061 | B2 | 1/2016 | Schouwenburg |
| 2006/0106742 | A1 | 5/2006 | Bochicchio |
| 2006/0208893 | A1 | 9/2006 | Anson |
| 2006/0287760 | A1* | 12/2006 | Charych ............... B66F 9/0755 700/214 |
| 2008/0035727 | A1 | 2/2008 | Stanzel |
| 2008/0114487 | A1* | 5/2008 | Schuler ................. G06Q 10/06 700/217 |
| 2011/0227725 | A1* | 9/2011 | Muirhead .......... B65D 19/0016 340/539.13 |
| 2014/0060942 | A1 | 3/2014 | Qu |
| 2014/0263635 | A1* | 9/2014 | Jones .................... G06Q 10/087 235/385 |
| 2014/0297487 | A1* | 10/2014 | Bashkin ............... G06Q 10/087 705/28 |

OTHER PUBLICATIONS

PCT; App. No. PCT/US2017/057999; International Search Report and Written Opinion dated Jan. 9, 2018.

\* cited by examiner

SYSTEMS AND METHODS OF TRACKING PRODUCTS DURING TRANSPORT

CROSS-REFERENCE TO RELATED APPLICATION

This application claims the benefit of U.S. Provisional Application No. 62/412,441, filed Oct. 25, 2016, which is incorporated herein by reference in its entirety.

TECHNICAL FIELD

This invention relates generally to tracking products.

BACKGROUND

In a modern retail environment, there is a need to improve the customer service and/or convenience for the customer. One aspect of customer service is a customer's access to products. There are numerous ways to provide products to locations to allow customers access to products. However, there is a need to improve product distribution.

BRIEF DESCRIPTION OF THE DRAWINGS

Disclosed herein are embodiments of systems, apparatuses and methods that track products. This description includes drawings, wherein.

Figure 1:
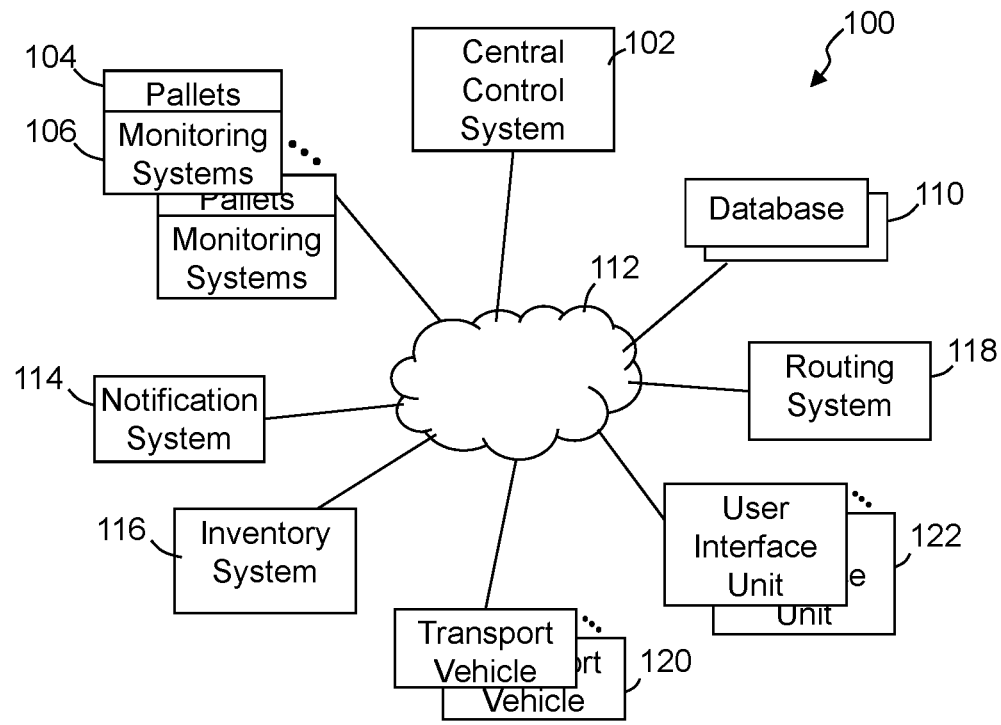
FIG. 1 illustrates a simplified block diagram of an exemplary tracking system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein to track product shipments, and/or identify and limit shipping inaccuracies. In some embodiments, a system tracks palletized products with an array of sensors positioned relative to multiple products collectively arranged on a transport pallet. The transport pallet is configured to support the multiple products while being transported, and in some implementations is constructed to allow lifting systems (e.g., forklifts, pallet jacks, etc.) to interact with the pallet to position and transport the pallet and products a relatively short distance (e.g., within a distribution center, a shopping facility, onto and off of delivery vehicles, and the like). A pallet control system is communicatively coupled with the array of sensors to receive sensor data from one or more sensors of the array of sensors. Based on the sensor data, the control system is configured to determine the condition of one or more of the multiple products at least as the multiple products are transported. A notification alert can be generated, and/or in some embodiments, some or all of the condition information can be transmitted to a notification system configured to provide notification to a worker regarding the condition of the one or more products.

FIG. 1 illustrates a simplified block diagram of an exemplary tracking system 100, in accordance with some embodiments. The tracking system is configured to at least track product shipping pallets and/or other such product support devices (e.g., bins, crates, containers, and other such devices that support products during transport) and palletized products supported by the pallets. To simplify the description, the below is described with general reference to pallets and palletized products; however, it will be apparent that other product support devices and/or structures can be used without departing from the inventive aspects of at least some embodiments. The tracking system 100 includes a central control system 102, multiple pallets 104 and/or other such support devices, and multiple mobile monitoring systems 106. One or more communication and/or computer networks 112 enable communication between devices of the system. Some embodiments include one or more databases 110 storing relevant information, such as but not limited to inventory information, product information, pallet information, pallets history information, monitoring systems history information, customer information and/or profiles, other such information, code, purchase history information, other such information, and typically a combination of two or more of such information. The central control system, in at some applications, can track multiple pallets 104 and/or monitoring systems 106 cooperated with different pallets or other product support devices.

In some embodiments, the tracking system 100 includes one or more notification systems 114 that can provide notifications to one or more workers. The system may include one or more inventory systems 116 that track inventory, direct the distribution of inventory, and/or in some instances receive and/or distribute product orders from shopping facilities (e.g., stores, distribution centers, fulfillment centers and/or other such shopping facilities). One or more routing systems 118 may be included in the tracking system 100, which can be in communication with the inventory system and/or the central control system to receive information about a product and its intended destination, and typically has access to a current location of the product. The routing system can determine and communicate routing instructions to one or more workers, forklift systems, transport vehicles 120 and/or other devices to direct the movement of palletized products, other individual products and/or collections of products. The system may further include, utilize and/or communicate with one or more transport vehicles 120, which can be configured to transport the palletized products. The vehicles may be configured to transport within a distribution center, in and/or outer of other delivery vehicles, across town, across one or more states, between countries, and the like. User interface units 122 can be included in the system or in communication with one or more systems of the tracking system. The user interface units can be smartphones, tablets, shopping facility specific electronic devices, and/or other relevant devices that can receive information and/or provide information to the user.

Figure 2:
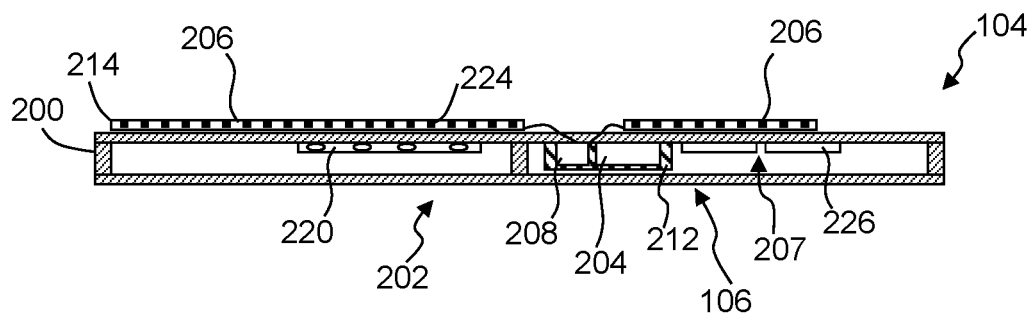
FIG. 2 illustrates a simplified block diagram, cross-sectional view of an exemplary transport pallet, in accordance with some embodiments.

FIG. 2 illustrates a simplified block diagram, cross-sectional view of an exemplary transport pallet 104 with a monitoring system 106, in accordance with some embodiments. The transport pallet includes a frame 200 configured to support one or more products to be transported and/or stored. Some embodiments further include a monitoring system 106 that include a pallet control system 204 that can be communicatively coupled with one or more sensors and/or one or more arrays of sensors 206-207. Some embodiments include one or more mounting couplers 212 that are secured with the pallet and enable the pallet control system and/or a pallet control circuit to be temporarily and removably cooperated with the pallet. In other implementations, the pallet control system is fixed to the pallet, while in still other embodiments, the pallet control system may be secured to a removable part of the pallet, such as a removable beam, plate, cross-beam, or the like of the pallet. The monitoring system 106 may, in some embodiments, include one or more alert systems 220 that are communicatively coupled with the pallet control system 204.

Figure 3:
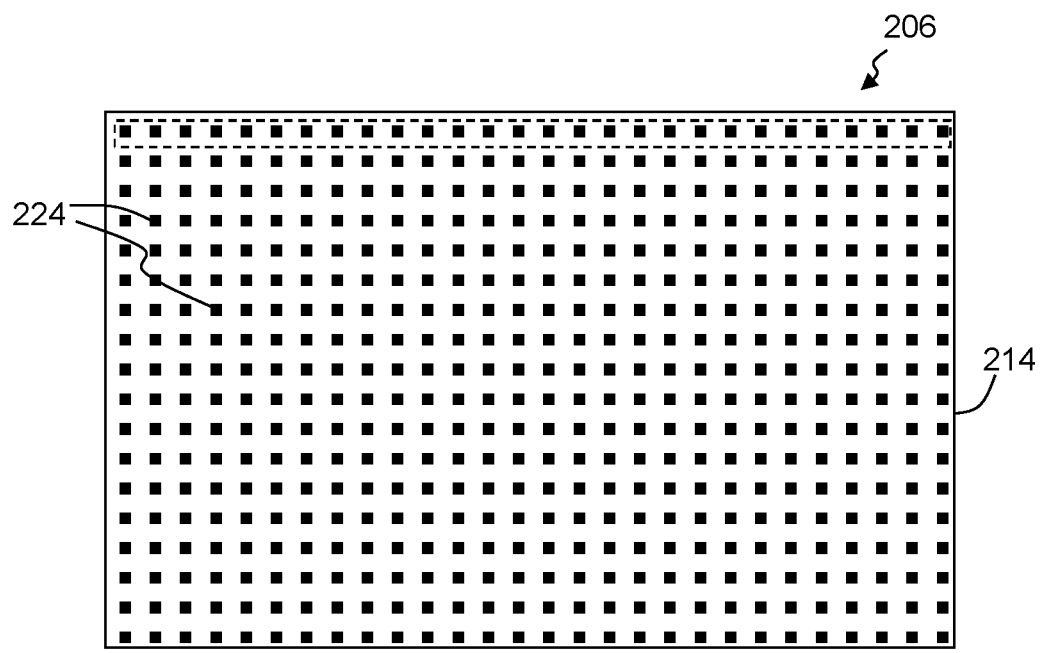
FIG. 3 illustrates a simplified overhead, partially transparent view of an exemplary array of sensors, in accordance with some embodiments.
Figure 4:
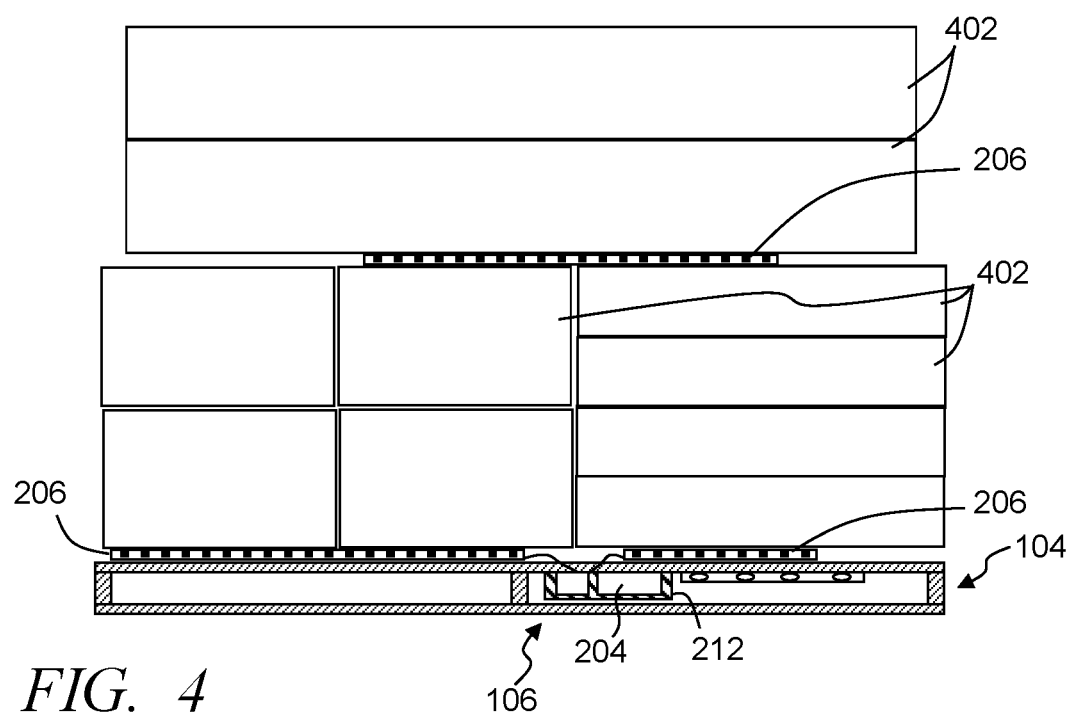
FIG. 4 illustrates a simplified cross-sectional view of an exemplary transport pallet with multiple arrays of sensors and with multiple products stacked on and supported by the pallet, in accordance with some embodiments.

FIG. 3 illustrates a simplified overhead, partially transparent view of an exemplary array of sensors 206, in accordance with some embodiments. FIG. 4 illustrates a simplified cross-sectional view of an exemplary transport pallet 104 with multiple arrays of sensors 206-207 and with multiple products 402 stacked on and supported by the pallet, in accordance with some embodiments. Referring to FIGS. 1-4, in some embodiments the monitoring system 106 includes the pallet control system 204 and the sensors and/or array of sensors 206-207 couple with the pallet control system 204 to communicate sensor data to the pallet control system. The array of sensors can include sensors to detect one or more conditions and/or events. For example, an array of sensors can measure weight, pressure, temperature, and/or moisture. As a further example, an array of sensors may include pressure-sensitive sensors that detect the weight of the products 402 stacked on or adjacent the array of sensors. Some embodiments include one or more interfaces operatively coupled with one or more of the sensors and configured to transmit sensor data from the array to the pallet control system.

The sensors 224 of an array of sensors 206 may be arranged, in some applications, as multiple individual sensors, multiple individual sensor strips of sensors, and/or a sensing grid or matrix of sensors. In some implementations, one or more sensors may be secured with and/or embedded into the pallet. In other implementations, an array of sensors may include a casing 214 with the sensors of the array be positioned with the casing 214 and distributed in a known pattern (e.g., strip, matrix, grid, etc.). The array of sensors 206 illustrated in FIG. 3 are shown as arranged to form a grid. Other sensor arrays, however, can be implemented in other arrangements. For example, the array of sensors may be in the form of lengthy rectangular sensor strips that can be positioned in desired locations on the pallet and/or between products.

In some embodiments, one or more arrays of sensors are movable relative to a pallet 104 and/or products positioned on the pallet. Further, the multiple sensors of an array can be fixed in position relative to other sensors of the array through a rigid or flexible casing 214 providing a modular sensor array. The casing can include a communication cable, port or the like that allows the sensors to communicatively couple with a pallet control system of the pallet control system. Additionally or alternatively, a wireless transceiver can be included with the sensor array to provide wireless communication, such as to the pallet control system, the central control system, a worker's user interface unit 122 (e.g., smartphone, tablet, computer, etc.), and/or other devices. In some applications, one or more power sources (e.g., rechargeable and/or replaceable battery, capacitor, or the like) can be cooperated with and/or within the casing 214 to supply power to the sensors, and when relevant power a user interface of the sensor array (e.g., buttons, LED display, etc.), an array processor, an array memory, and/or other components of a modular sensor array. The array of sensors can be cooperated in the casing and collectively movable relative to the multiple products and the pallet. Multiple of such modular sensor arrays may be utilized with a single pallet.

The sensors of the array of sensors can be positioned to detect weight and/or pressure of one or more products, such as, for example, detecting pressure or weight indicating the presence or absence of a product 402 or package at each individual sensor. An array can include a distributed quantity of sensors 224 with sufficient discrimination and resolution so that, in combination, the sensor data provided by the array of sensors enables the pallet control system to identify a quantity (and possibly the type) of product(s) on the pallet 104. Further, the size of the sensor array may vary depending on an intended implementation. In some applications, one or more arrays can be positioned to substantially cover a product support surface of the pallet, while in other implementations, one or more arrays of sensors can be strategically placed to correspond to different products and/or expected distribution of products. Further, the array of sensors may be organized in sub-arrays. In some embodiments, the sensors and/or array of sensors may be similar to or the same as sensors and sensor arrays described in U.S. Patent Application No. 62/342,540, by Mattingly et al., filed May 27, 2016, and entitled Systems and Methods for Arranging Sensors to Monitor Merchandise Conditions at or Near Shelves, which is incorporated herein by reference in its entirety.

In some embodiments, one or more sensors of the array of sensors 206 may include and/or be formed of piezoelectric material. Piezoelectric sensors can be versatile sensors that can measure various characteristics, and in some implementations can be used to detect for example pressure, change in pressure, force, change in force, temperature, change in temperature, electrical conductivity (e.g., detecting spill), and/or other such conditions. For example, one or more sensors of an array can be configured to measure at predetermined locations along a grid at least one of weight, temperature, moisture, and movement due to an impact. In some instance the grid enables the measure of dimensions of products placed on the array. Further, piezoelectric sensors can be relatively sturdy and therefore do not need to be replaced frequently. Piezoelectric sensors are an example of a suitable sensor type in some applications. Other sensors and/or sensor materials can additionally or alternatively be utilized, such as, for example, other types of pressure sensors, weight sensors (e.g., load cells, strain gauges, etc.), other such sensors or combination of two or more of such sensors.

Other sensors may additionally or alternatively be included in an array and/or separate from an array. For example, some embodiments include one or more gas emission sensors, light sensors, motion sensors, and/or other such sensors. Gas emission types of sensors are useful, for example, in detecting chemicals that may be associated with deteriorating conditions of certain perishable items, such as, for example, certain types of fruit.

Further, some embodiments include one or more other sensors and/or sensor systems 226, and/or one or more other arrays of sensors 207. These sensor systems and/or arrays can be configured to provide the pallet control system 204 with additional sensor data. In some embodiments, for example, the sensors and/or sensor systems 226 can include one or more radio frequency identification (RFID) tag readers capable of reading RFID tags that are within threshold distance to the sensor system, one or more optical based scanning sensor systems to sense and read optical patterns (e.g., bar codes), one or more location detection sensor systems (e.g., global positioning satellite (GPS) systems and/or detectors), one or more moisture sensors, one or more shock sensors, one or more temperature sensors, one or more movement sensors (e.g., inertial sensors, accelerometers, etc.), one or more distance sensors (e.g., laser sensor systems, optical systems, sound/ultrasound systems, etc.), one or more gas emissions sensors, one or more cameras, one or more digital imaging devices, one or more active-pixel sensors (APS), one or more light sensors, other such sensors, or a combination of two or more of such sensors. The foregoing examples are intended to be illustrative and are not intended to convey an exhaustive listing of all possible sensors. Instead, it will be understood that these teachings will accommodate sensing any of a wide variety of circumstances in a given application setting.

As further examples, one or more sensors may include one or more optical cameras (although other sensor types may also be used), and/or charged-coupled devices (e.g., CCD cameras). These digital imaging devices may be selected to be relatively small in size and provide relatively high-quality image data. Alternatively, it is also contemplated that active-pixel sensors (APS) may be used (e.g., CMOS APS sensors). These sensors generally provide lower quality image data but may be less expensive than CCD sensors and use less power. The imaging sensors can capture information that can be used to identify a type and/or orientation of products and/or cases (e.g., through barcode labels, text recognition, pattern and/or color recognition, etc.), location of a pallet, orientation of a pallet, and/or other such information. In one form, these image data may be compared to product and/or packaging images in an image database to identify the products, which can be used to track products, confirm proper placement of products, etc. As another example, regarding orientation the capture images can be used to determine whether products are facing toward an exterior of the pallet, offset with respect to the pallet or other products, positioned in an undesirable orientation (e.g., upside down, or not in a predefined desired orientation), and the like.

The types of sensors used may be selected and customized to the particular nature of the products and/or pallets (or other product support). In some embodiments, the sensors may be determined or selected based on the perishable nature of the products. For example, potatoes are not particularly sensitive to temperature, so an array of sensors proximate potatoes may omit temperature sensors. In contrast, there may be temperature sensors adjacent products that have temperature thresholds. In another example, an array may include gas sensors to monitor apples, bananas, and grapes on the pallet. Other embodiments may utilize standardized sensors and/or sensor arrays to include various types of sensors, and the sensor data that is relevant to the particular products may be considered and analyzed, while sensor data that is not relevant may be ignored.

As introduced above, some embodiments include one or more sensors or array of sensors that are configured to collect identification data regarding the products 402 on the pallet 104. Additionally or alternatively, the pallet control system 204 and/or the central control system 102 may be in communication with or can access data collected by one or more sensors that are not part of the monitoring system 106, such as stationary scanning devices, portable robot scanning devices, hand-held scanning devices, and/or other such scanning devices. For example, a portable robot scanning device may be supported by wheels, tracks, treads, rollers, etc. allowing the scanning device to move along and/or around a pallet and products, and typically along a series of multiple pallets. The separate scanning device can include one or more reader sensors configured to capture and/or detect identification data of products 402, pallets 104, location identifiers, and/or other such identifier information. The scanning device can be positioned at a location by which pallets are moved. The one or more reader sensors may be directed to collect identification data from pallets and/or products.

The reader scanners and identification data may any of various types. For example, the reader scanner may be a barcode reader, an RFID reader, an NFC reader, a laser imager, an optical sensor, an image recognition device, a text capture device, other such identification detection systems, or combination of two or more of such systems. The identification data may correspond to a type of reader scanner used and may constitute a barcode; an RFID tag; an NFC tag; text, logos, graphics, and/or symbols from the products; the shape and/or size of the products; other types of identification data located on the products or pallet; or combination of two or more of such identifying information. It should be understood that reference to reading identification data from the products and/or pallet includes reading such identification data from any packaging of the products.

In one form, reader scanner may comprise a barcode reader that is configured to detect and/or read barcodes on products, pallets, wrappings of multiple products, and/or other such barcodes. In some applications, the barcode reader may scan product and/or pallet barcode labels with universal product codes (UPCs). In another form, the reader scanner may have an optical reader and/or image capture device (in addition to or in lieu of a barcode or other reader). In this form, the reader scanner may be configured to capture images of at least one product and/or pallet, which can be used to determine and/or can include identification data regarding one or more products and/or pallets.

Based on sensor data, the tracking system 100 and/or central control system can determine and/or verify that identification data obtained for a pallet corresponds to, or matches, identification information regarding one or more products being placed onto and/or intended to be on the pallet, and/or confirm an identification of the pallet. This information may be used in addition to sensor data from the one or more sensors and/or sensor arrays of the monitoring system 106. For example, a mapping of product and their location relative to the pallet and other products placed on the pallet may be generated based on the detected identification information, the sensor data (e.g., from one or more arrays of sensors), and in some instances dimensions information regarding an identified product (e.g., length, width, height, weight information from the inventory system). The mapping can further include relative locations of different arrays of sensors relative to placement of products when stacked onto the pallet. In some instances, a mapping of the relative placement of products and/or sensors on the pallet is predefined and directs workers regarding the placement of sensors, sensor arrays and products, with data from the sensors and/or sensor arrays used to in part confirm the stacking is consistent with the predefined mapping. Alerts may be generated when stacking is inconsistent with the predefined mapping.

Further, in some instances, the sensor data allows the tracking system to determine a location of one or more products cooperated onto the pallet and/or confirm an expected location of one or more products positioned on a pallet. The sensor information can further be used to determine and/or confirm inventory on the pallet, and may compare it to an on-hand or worker specified inventory record (e.g., recorded as one or more workers and/or systems load the pallet). It is generally contemplated that, in some instances, sensor data can be used to identify a positioning of a product when cooperated with one or more other products and on the pallet, and/or identify a location of that product relative to one or more other products on the pallet (e.g., using one or more arrays of sensors 206). Further, in some embodiments, one or more sensors and/or sensor arrays may be positioned on the pallet and/or between products to collect data regarding the presence of products, and the sensor data from the one or more sensors and/or array of sensors can be used to calculate a quantity of products on a pallet. In one form, an array of sensor may include a plurality of weight sensors arranged at a first position on the pallet and/or between products to collect weight data regarding the one or more products at certain positions on the pallet. The weights sensors may be arranged as a plurality of individual strips, or squares, defining a grid, or other such configurations. In this form, the sensors can detect the weight or pressure at different locations and/or along areas relative to the pallet, and this weight data can be used as part of data to identify products, calculate quantities of one or more products, detect product shifting, detect damage to products, and/or other such determinations. For example, the system may use known weight information for an individual product 402 and compare sensed weight data relative to known weight information. Further, in some instances, the weight measurements may indicate that one or more incorrect products have been placed onto the pallet, damage to products, and/or other such indications.

The inventory system 114 and/or databases 110 maintains a product information including identification information corresponding to the products intended to be placed and/or positioned on pallets. Using the inventory information, the system can compare the identification data with the identification information in the product database for one or more products that is supposed to be on a pallet. So, for example, in the case of a barcode, the system compares the barcode of a product detected on a pallet to a known barcode in the product database. As another example, in the case of image recognition, the system compares the images of one or more products at a location (e.g., three dimensional location information and/or three dimensional volume data) on a pallet that is captured by one or more sensors with known images of the products from an image database. In this example, it is contemplated that the images may correspond to parts or all of one or more products. The images collected by a sensor may include the general overall physical dimensions and shape of the product and/or symbols and/or text from the product. These images may be compared to corresponding reference images showing physical dimensions, shape, symbols, and/or text from the image database. In one form, the identification information of products from the image database may be a planogram that shows a general layout of one or more types of specific products on a pallet.

In some embodiments, the pallet control system 204 is operatively coupled to the one or more array of sensors and/or other sensors, and maintaining inventory information and/or in communication the inventory system 116. The pallet control system can be configured to compare the identification data collected by the one or more sensors with product identification information from the inventory information, verifies that the identification data from the one or more sensors corresponds to the identification information for one or more expected products from the inventory information. In some instances, the pallet control system may further confirm or calculate a quantity of inventory on the pallet based on the sensor data. For example, in one simple form, the pallet control system may take the total weight measured by one or more sensors at a first location or area of a pallet, accesses known weight information for one or more products from the product inventory data, and may divide the two values to calculate a quantity. However, it should be understood that there are various other ways to calculate quantity using the sensor data, including for example, sensor data from an array or grid of weight sensors each with sufficient discrimination and resolution so that, in combination, the sensors may be able to identify the quantity and possibly the type of product at various positions on the pallet. The calculated quantity may be compare to expected inventory record information. Alerts (on the pallet (e.g., through alert system 220) and/or remote from the pallet (e.g., user interface unit 122)) may be generated when discrepancies are detected between sensed and expected data.

Figure 5:
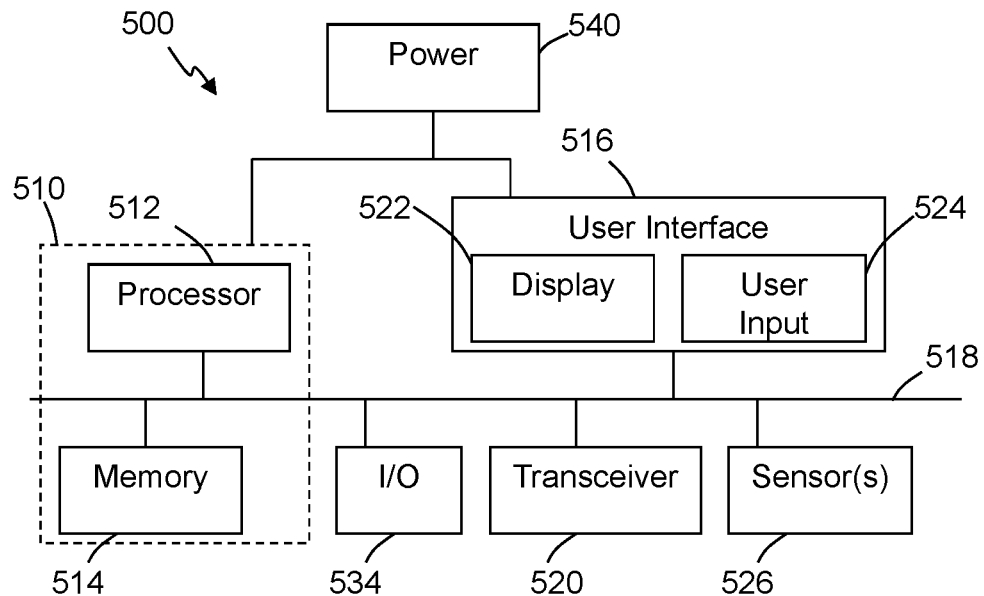
FIG. 5 illustrates an exemplary system for use in implementing methods, techniques, devices, apparatuses, systems, servers, sources and tracking products, in accordance with some embodiments.

Further, the circuits, circuitry, systems, devices, processes, methods, techniques, functionality, sensor systems, sensors, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the system 100 of FIG. 1, and/or other above or below mentioned systems or devices, or parts of such circuits, circuitry, functionality, systems, apparatuses, processes, or devices. For example, the system 500 may be used to implement some or all of the central control systems 102, the mobile monitoring system 106, the inventory system 116, the routing system 118, pallet control system 204, sensor systems and/or sensor arrays, alert system, and/or other such components, circuitry, functionality and/or devices. However, the use of the system 500 or any portion thereof is certainly not required.

By way of example, the system 500 may comprise a control circuit or processor module 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system may implement the central control system 102 with the control circuit being a central control circuit, a pallet control system with the control circuit being a pallet control circuit, or other components.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network 112 (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 112. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

As described above, some embodiments track and/or monitor pallets and palletized products prior to, during and/or after transport. The tracking can include, for example, tracking a condition of a collection of products, tracking a condition of one or more products of a collection of products, tracking location information, confirming a location, confirming a pallet, and/or other such tracking. Some embodiments include one or more arrays of sensors 206 that can be positioned relative to one or more products collectively arranged on a transport pallet 104. The transport pallet is configured to support one or more products while being transported and/or stored.

One or more pallet control systems 204 can be temporarily or permanently cooperated with the pallet 104. Some embodiment include one or more mounting couplers 212 that are fixed with the pallet and configured to receive and temporarily secure one or more pallet control systems 204, sensors, transceivers 208, and/or other such components. The mounting coupler enables the pallet control system and/or pallet control circuit to be temporarily and removably cooperated with the transport pallet, which allows a pallet control system to be moved between different pallets.

The pallet control system is further configured to be communicatively coupled with one or more sensors and/or sensor arrays 206-207. The coupling may be wired and/or wireless (e.g., Wi-Fi, Bluetooth, ZigBee, etc.). In some embodiments, one or more arrays of sensors can be positioned to interact with and/or sense conditions corresponding with products 402 that are positioned on the pallet (or in another product support device). For example, an array of sensors can be placed on one or more portions of a support surface of the pallet with one or more products placed on top of the sensor array. Similarly, one or more arrays of sensors may be placed between two or more products (e.g., on a first product and under a second product, between sides of two products, etc.), placed above one or more products, and/or other such positions or combination of two or more of such positions. For example, a second array of sensors, which is communicatively coupled with the pallet control system, can be positioned relative to other products supported by the pallet. As a further example, a first array of sensors can be positioned to be under a first set of one or more products supported by the pallet to provide sensor data corresponding to the first set of the products, and a second array of sensors can be positioned to be under at least a second set of one or more products supported by the palled and provide sensor data corresponding to the second set of the products. In some embodiments, for example, one or more arrays of sensors may include a plurality of individually placed sensors, individual strips of multiple sensors that are placed to define a grid and positioned to be under or adjacent at least a first set of one or more products supported by the pallet, a grid of numerous sensors, and/or other such configurations.

The pallet control system 204 is configured to receive sensor data from the one or more sensors and/or one or more sensors of the one or more arrays of sensors. The pallet control system, the central control system and/or another evaluation system can evaluate the sensor data. In some embodiments, for example, the pallet control system can evaluate the sensor data and determine based on the sensor data a condition of one or more products supported by the pallet as the products are transported and/or are in a storage location. The evaluation can include comparing the sensor data to one or more known parameters (e.g., identifier information, location information, etc.), thresholds, and/or other factors. Some embodiments consider thresholds such as but not limited to one or more weight thresholds, weight difference thresholds, pressure thresholds, shock thresholds, moisture thresholds, and/or other such thresholds. Further, the evaluation may consider relationships between multiple different thresholds and/or dependencies between different thresholds (e.g., moisture threshold being related to a threshold loss in weight may indicate a leak of a product, a weight threshold in relation to a shock threshold may indicate damage to one or more products, and/or other such relationships between two or more thresholds).

Again, multiple sensors and/or multiple sensor arrays may be positioned relative to a single pallet and in communication with a pallet control system cooperated with that pallet. Accordingly, in some embodiments the pallet control system is configured to further receive sensor data from one or more sensors of one or more array of sensors, and determine conditions of one or more products based on sensor data from the one or more sensors and/or one or more sensor arrays. Some embodiments may use different sensor arrays to track conditions of different sets of products. For example, a first array of sensors can be are positioned to detect conditions associated with a first set of one or more products (e.g., under or adjacent the first set of products) and provide sensor data corresponding to the first set of products to the pallet control system, and a second array of sensors can be positioned to detect conditions associated with a second set of one or more products (e.g., under at least the second set of products) and provide sensor data corresponding to the second set of products to the pallet control system. The pallet control system can receive the sensor data from one or more sensors of the first and/or second array of sensors, and determine a condition of one or more products of the first set of products based on sensor data from the first array, while separately determining a condition of one or more products of the second set of products based on the sensor data from the second array.

In some embodiments, the pallet control system and/or the central control system can use the sensor information in determining the condition of one or more products, evaluate parameters relative to a delivery schedule, routing and/or intended destination, and/or other such factors. The pallet control system, in some applications, is configured to detect based on the sensor data a change in a quantity of the multiple products. This change can be based on a change in weight and/or sequence of changes in weight. Further, the pallet control system may store data corresponding to one or more products supported by the pallet, such as weight of each product, weight of a grouping (e.g., case) of a product, temperature thresholds, and other such data. Using this information the pallet control system (or the central control system) may identify a change in weight as corresponding to that of a particular product or grouping of a product and determine that a particular product or products were removed. Further, in some instances, the pallet control system stores routing and/or delivery information, which may include for example, a location where some or all of the products supported by the pallet are to be delivered. Using GPS data, RFID data of a location identifier (e.g., a store or distribution center identifier), and/or other such data, the pallet control system may identify when products are removed and determine based on the route and/or delivery information whether the removed product is intended for the location where the product was removed.

In some embodiments, for example, the pallet control system, based on the sensor data, is configured to detect when the products and transport pallet are placed at an incorrect location for more than a threshold period of time, and to cause a notification to be wirelessly transmitted to the separate notification system 114, the central control system and/or other system. For example, the pallet control system can cause the transceiver 208 to transmit a notification to the central control system (e.g., Internet, cellular communication, Wi-Fi, Bluetooth, etc.), and the central control system can activate the notification system (e.g., cause a notification to be communicated to a worker's user interface unit, cause a notice to be presented on a display, etc.). The threshold period of time can be based on one or more factors, such as but not limited to a facility where the pallet is placed (e.g., whether in a distribution center, shopping facility, etc.), whether the pallet was taking from a delivery vehicle, whether the location is inconsistent with a delivery location and/or routing information, types of products supported by the pallet, and/or other such factors. For example, a pallet control system cooperated with a pallet being transported to an intended delivery location may detect through an RFID tag reader and/or bar code reader sensor 226 of the pallet an identification of facility at which that the pallet has been removed from a delivery vehicle. Based on the detected identification, the pallet control system can determine that the location is inconsistent with the intended delivery location, and a relatively short threshold of time may be considered before an alert notification is generated through the alert system 220 and/or a separate notification system 114. As another example, when the pallet is removed from a delivery vehicle at an intended delivery location, the pallet control system may evaluate sensor data relative to a second threshold corresponding to an amount of time before products should be removed from the pallet.

In some embodiments, the pallet control system is configured to cause the condition information obtained from one or more sensors to be wirelessly transmitted to the central control system 102 and/or a separate notification system 114 that may be part of or separate from the central control system. The central control system and/or the notification system can provide a notification to one or more worker regarding the condition of the one or more products. The notification system can include one or more displays positioned at one or more locations that can be visible to workers, one or more auditory systems, visual indicators (e.g., one or more lights, LEDs, etc.), workers' user interface units 126 (e.g., text message from the pallet control system and/or central control system), other such devices, or combination of two or more of such devices. In some embodiments, for example, the pallet control system and/or the central control system can wirelessly communicate a notification to a worker's user interface unit that displays and/or audibly plays a notification regarding one or more conditions of products. The conditions may include, but are not limited to, numerical representations of sensor data, relationships of sensor data to one or more thresholds, notification of potential damage to a product, notification that one or more products are believed missing, notification of weight inconsistency or other inconsistency, notification of potential damage (e.g., due to excess force and/or pressure), location information, a notification that the pallet is at an incorrect location, a notification that a pallet is or is not to be removed from a truck at a current location (e.g., store, distribution center, etc.), other such notifications, or combination of two or more of such notifications.

In some embodiments, the pallet control system 204 may further be configured to communicate, via the transceiver 208, to one or more other pallet control systems. Sensor information may be exchanged. For example, one or more sensors on a separate pallet may capture images of the pallet and products and provide that sensor data to the pallet control system to be used in evaluating product conditions and/or other factors (e.g., detecting damage by comparing previous images of products and/or the collection of products on the pallet with subsequent images). Further, in some applications, multiple pallet control systems can operate a mesh network providing communication between a pallet control system and the central control system via one or more hops through other pallet control systems. Additionally or alternatively, sensor data and/or other data may be received from another pallet control system and stored locally on a pallet control system until that data is later uploaded to the central control system.

Further, in some embodiments an alert system 220 may be cooperated with a pallet 104 and communicatively coupled with the pallet control system 204. The pallet control system is can be configured detect a predefined condition based on the sensor data and to activate the alert system based on the detected predefined condition. Upon activation, the alert system can generate a visual alert, an audible alert, display text, other such alerts, or combination of two or more of such alerts. For example, the alert system may include one or more lights that can be activated to be detected by a worker. The alter system may have different colored lights and/or lights that can be activated to generate one of multiple different potential colors, with different colors representative of different conditions. Similarly, the lights may be flashed in one or more flash patterns to draw attention to the alert system and/or indicate different conditions. An audible alert can additionally or alternatively be generated. Further, in some instances, the pallet control system and/or the alert system can be configured to cause the alert system to modify the alert over time, such as but not limited to progressively increasing a flashing rate and/or intensity of lights, to progressively increase a volume and/or modify a pitch of an audible alert, and/or other such modifications. Some embodiments may further modify the alert based on surrounding conditions, such as a level of external sounds can be detected and an audible alert may be adjusted to be at least a threshold above the external sounds, an exterior light intensity can be detected through one or more sensors 226 and the intensity of one or more lights can be adjusted based on the exterior light intensity, and/or other such adjustments.

Processing capabilities are built into and/or cooperated directly with a pallet to allow tracking of one or more conditions specific to that pallet. Sensors and/or sensing capabilities are cooperated with the pallet to detect and/or determine conditions (e.g., detect when a case of product has been added or removed, detect the occurrence of weight changes, etc.). For example, the system can detect weight changes due to loss of product (partial or in full) from damage, spillage, theft, removal for stocking, etc. The sensors can be used to allow the pallet control system to detect and/or measure temperature, shock, location (e.g., using GPS), weight, distance, gas emissions, pressure, humidity, light, identifiers (e.g., RFID, barcodes, serial numbers, etc.), and/or other such information and/or conditions. Monitoring can be implemented while products are loaded onto the pallet, during transport, during delivery, during stocking, and substantially any other point along the way. Notifications and/or alerts can be generated based on the sensor data. The system can continue to monitor pallets for damaged goods (e.g., something gets dropped, something falls over, misplaced, etc.). In some embodiments, the pallet and/or pallet control system can include identifying information (e.g., a bar code, an RFID tag, a serial number, etc.). The pallet identification can be used to confirm a correct pallet is removed from loaded onto a correct delivery vehicle, removed at a correct delivery location, and the like.

In some embodiments, the sensors can include one or more RFID tag readers. The RFID tag readers can detect products cooperated with a pallet. This information can be used by the pallet control system and/or communicated to a central control system to confirm correct products are cooperated with the pallet in accordance with an inventory list, a delivery schedule and/or routing information.

The system can further detect when products are removed, whether correct products are removed, confirm accurate products are removed (e.g., weight, RFID, etc.), and detect other conditions. Notifications can be communicated based on the detected data, such as incorrect product removed, incorrect location, damage, leak, incorrect pallet removed from a delivery vehicle, and the like. In some embodiments, the pallet control system can store (e.g., cache) the sensor data and/or determinations made based on sensor data to be later transmitted (e.g., upon reaching a destination). The communication from the pallet control system can be via wired or wireless communication. In some instances, a physical communication and/or power interface can be included, such as but not limited to a USB interface.

As described above, the pallet control system, one or more sensors, one or more transceivers, the alert system and/or other components may be temporarily cooperated with a pallet. In some instances, for example, a central plank can be removable, while further having the mounting coupler 212 and/or have one or more components fixed to the plank. The plank can be placed on the pallet in preparing the pallet for use. An identifier of the pallet may be provided to the pallet control system (e.g., through bar code reader, RFID tag reader, user interface, etc.) allowing the pallet control system to temporarily be cooperated as associated with the pallet.

In some embodiments, the pallet control system, the central control system and/or one or more other computing devices or analytics engines may receive and analyze at least some of the sensor data. The pallet control system, central control system and/or computing device may access one or more databases 110 to determine identify products, identify potential problems, confirm information, identify data trends and/or other relevant information regarding one or more products being placed on, supported by and/or removed from a pallet or other product support device. For example, the pallet control system and/or central control system may access a product and/or inventory database regarding specific characteristics and data for the particular products being monitored. The pallet control system and/or central control system may access sensor history database (or memory device) that may store and record sensor readings for the products and/or types of products being monitored, operation of specific sensors and/or arrays of sensors (e.g., to identify defective sensors), and/or other such historic information. The pallet control system may access one or more databases 110 via an input/output hub that communicates wirelessly with the central control system 102, directly with the databases, via a distributed computer network 112, or the like. Again, the processing of the sensor data can be used to identify problems with a specific product, problems with a location, problems with transport temperatures, problems with a pallet, confirm accurate transport parameters, confirm accurate products, confirm locations, analyze various data trends, and/or other such processing.

In some instances, the pallet control system and/or central control system may evaluate products freshness levels, particularly for perishable products. When the pallet control system and/or central control system receives sensor data, it may combine it with the sensor reading history and with specific information regarding the product (e.g., from the product database). For example, the product information may include data about the product, such as temperature thresholds, shelf life, expiration data, weight, desired orientation, etc. to be evaluated in conjunction with sensor readings allow a determination of a stage of ripeness, a sell-by date, an estimated expiration date, damage, missing, and/or other determinations. In some forms, the determination of freshness level may include a task to be performed by a worker such as: move the pallet, remove a product from a pallet, place the perishable product on a sales floor, relocate the perishable product, move the perishable product into climate controlled storage, and the like. In some forms, the pallet control system and/or central control system may determine information regarding the ripeness or freshness left on a product based on predictive comparisons of other similar products.

In some embodiments, one or more sensors and/or sensor arrays are arranged to detect color or texture changes in the merchandise. For example, the arrangement of sensors may include optical sensors (such as in an array of sensors) that capture image data of products. It is known that the color and/or texture of certain perishable items, including, for example, certain meat and fruit (such as pears and apples), will change over time. However, non-perishable items may also exhibit color changes over time, such as due to fading over time when exposed to sunlight. The optical sensors can take continuous video or still images at certain time intervals, which show the color or texture of the merchandise over time and the changes in color or texture. These image data can be compared to preexisting image data previously captured by sensors and/or from the product database for that particular product that may be associated with one or more factors and/or thresholds. Thus, the pallet control system and/or central control system may be configured to analyze product freshness levels based on the analysis of sensor data over a predetermined amount of time for color and/or texture changes of the products to one or more thresholds.

In another example, the arrangement of sensors may include gas emission sensors that detect gas emissions of chemicals from the product indicating a change in freshness. It is known that certain fruit and other perishable items will emit chemicals indicating ever-decreasing shelf life. The gas emission data can be compared to preexisting data for that particular product that may be associated with preexisting threshold predictions for that product. In some embodiments, the pallet control system and/or the central control system can be configured to analyze product freshness levels based on the analysis of the gas emission data over a predetermined amount of time for chemical changes in the product.

It is also contemplated that the sensor readings in the sensory history database may be used to modify the preexisting conditions (e.g., shelf life predictions) in the product database. For example, an evaluation of the sensor readings may show that certain color, texture, and/or gas emission data empirically resulted in either a shorter or longer shelf life for the product than was predicted by preexisting standards. Accordingly, the sensory history database can be iteratively evaluated to correct and update shelf life predictions for various types of products.

In some embodiments, the sensors and/or arrays of sensors may be arranged to detect handling of one or more products by people, which may indicate tampering with the product. For example, the pallet control system and/or central control system may be configured to flag an incidence of product handling when it satisfies certain conditions and to provide an alert to investigate the product that is detected as having been handled. This determination may be made based on a combination of data from optical sensors, weight sensors, pressure sensors, other sensors, or combination of two or more of such sensors. The pallet control system and/or the central control system may be configured to maintain a separate and/or collective running count of these instances possibly suggesting tampering.

Some embodiments further analyze the temperature history of products. One or more sensors may be arranged to measure the temperature of products continuously, at predetermined intervals, randomly, in response to some event, or other such times. The temperature readings may be stored in the pallet control system, communicated to the central control system, stored in a history database, in other locations, or combination of two or more of such locations. The temperature readings may be used to establish cold chain compliance in attempts to ensure the temperature of the products (especially perishable products) remains within a temperature threshold ranges, possibly at different locations on the pallet. For many types of product, the temperature history of a product is a good predictor of freshness, remaining shelf life and/or other factors. The monitoring of the temperature allows a determination of the quality, expiration, amount of shelf life remaining, etc.

The pallet control system, central control system or other system may access data from the product database to be evaluated in conjunction with temperature readings to allow the evaluation of products, potential problems, and can cause changes (e.g., movement of a pallet, disposal of one or more products, calculation of a sell-by date, an estimated expiration date, a stage of ripeness, and the like. Some embodiments, based in part on the temperature history and/or other data, the system direct one or more workers to perform one or more tasks relative to the pallet of products, such as moving the pallet of products, placing one or more products on a sales floor, moving the pallet of products and/or one or more product into climate controlled storage, and the like. Measured temperature history data may be compared to preexisting temperature data from the product database for one or more particular products. In some implementations, the sensory history data can be iteratively evaluated to correct and update information about products.

Figure 6:
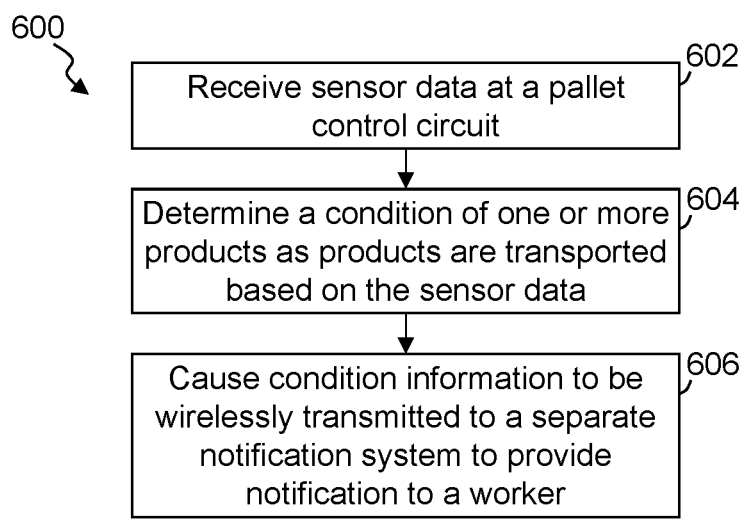
FIG. 6 illustrates a simplified flow diagram of an exemplary process of tracking palletized products, in accordance with some embodiments.

FIG. 6 illustrates a simplified flow diagram of an exemplary process 600 of tracking palletized products, in accordance with some embodiments. In step 602 sensor data is received at the pallet control system 204, cooperated with a pallet 104, from one or more sensors and/or one or more arrays of sensors positioned relative to one or more products collectively arranged on the pallet. The sensor data may be received over time, may be obtained in response to a request from the pallet control system, received based on a schedule implemented through a sensor array control system, or the like.

In step 604, a condition of one or more products of the multiple products is determined based on the sensor data. The condition may be determined as products are loaded onto the pallet, while the products are transported, as products are stored on a pallet, while products are being removed from the pallet, and the like. In step 606, condition information is transmitted, and typically wirelessly transmitted, to a separate notification system configured to provide notification to a worker regarding the condition of the one or more products. As described above, the separate notification system may be part of the central control system, and/or the central control system may receive the condition information and communicate the information and/or a notification instruction to the notification system.

Some embodiments receive the sensor data from a plurality of individual strips of sensors defining a grid and positioned to be under at least a set of one or more products supported by the transport pallet. For example, the received sensor data can include sensor data measured at predetermined locations and comprising at least one of weight, temperature, moisture, and movement due to an impact. Additional sensor data may be received from one or more other sensors and/or a second array of sensors. In some instances, for example, a first array of sensors can be positioned to be under at least a first set of at least one product of the multiple products and providing sensor data corresponding to the first set of the multiple products, while the second array of sensors is positioned to be under at least a second set of at least one product of the multiple products and providing sensor data corresponding to the second set of the multiple products. The condition of one or more products of the second set of the products can be determined based on the additional sensor data.

In some embodiments, directions can be provided to a worker regarding where one or more sensors and/or sensors of an array are to be positioned. This may include directing the worker to position an array of sensors, which can comprise a first casing with the sensors of the first array of sensors cooperated in the first casing and collectively movable relative to the multiple products and the first transport pallet, under a first set of products, while directing the worker to position a second array of sensors, which can comprise a second casing with the sensors of the second array of sensors cooperated in the second casing and collectively movable relative to the multiple products and the first transport pallet, under a second set of products. Some embodiments can further direct the temporary cooperation of a pallet control system and/or pallet control circuit with a transport pallet such that the pallet control system is temporarily and removably cooperated with the pallet. In some applications, a change in a quantity of the multiple products is detected based on the sensor data. Similarly, some embodiments are configured to detect, based on the sensor data, when the products and pallet are placed at an incorrect location for more than a threshold period of time, and cause a notification to be wirelessly transmitted to the separate notification system. Additionally or alternatively, some embodiments detect a predefined condition based on the sensor data, activate an alert system cooperated with the pallet and communicatively coupled with the pallet control system based on the detected predefined condition, and cause the alert system to generate at least one of a visual alert and an audible alert. Some embodiments may cause a communication to a worker's user interface unit regarding the condition.

In some embodiments, systems and methods are configured to track palletized products. Some embodiments comprise: a first array of sensors positioned relative to multiple products collectively arranged on a first transport pallet configured to support the multiple products while being transported; a wirelessly transceiver; and a pallet control circuit communicatively coupled with the wireless transceiver and the first array of sensors, wherein the pallet control circuit is configured to receive sensor data from one or more sensors of the first array of sensors, determine a condition of one or more products of the multiple products at least as the multiple products are transported based on the sensor data, and cause condition information to be wirelessly transmitted to a separate notification system configured to provide notification to a worker regarding the condition of the one or more products.

Some embodiments provide methods of tracking palletized products, comprising: receiving, at a pallet control circuit of a first transport pallet and from a first array of sensors positioned relative to multiple products collectively arranged on the first transport pallet configured to support the multiple products while being transported, sensor data; determining a condition of one or more products of the multiple products at least as the multiple products are transported based on the sensor data; and causing condition information to be wirelessly transmitted to a separate notification system configured to provide notification to a worker regarding the condition of the one or more products.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system to track palletized products, comprising:
a first array of sensors positioned with and relative to multiple products collectively arranged on a first transport pallet configured to support the multiple products while being transported such that the first array of sensors moves with the first transport pallet as the first transport pallet and the multiple products are transported, wherein the first array of sensors comprises at least an imaging sensor configured to capture image data;

a wirelessly transceiver; and a pallet control circuit communicatively coupled with the wireless transceiver and the first array of sensors, wherein the pallet control circuit is configured to receive sensor data from one or more sensors of the first array of sensors, generate a mapping of the multiple products and the placement of the multiple products relative to the first transport pallet as the multiple products are placed on the first transport pallet based on at least some of the image data of the sensor data and stored dimensions information regarding identified products being placed on the first transport pallet; determine a condition of one or more products of the multiple products at least as the multiple products are transported based on the sensor data, and cause condition information to be wirelessly transmitted to a separate notification system configured to provide notification to a worker regarding the condition of the one or more products; and wherein the first array of sensors comprises a plurality of individual strips of sensors defining a grid and positioned to be under at least a first set of the multiple products supported by the first transport pallet.

2. A system to track palletized products, comprising:

a first array of sensors positioned with and relative to multiple products collectively arranged on a first transport pallet configured to support the multiple products while being transported such that the first array of sensors moves with the first transport pallet as the first transport pallet and the multiple products are transported, wherein the first array of sensors comprises at least an imaging sensor configured to capture image data;

a wirelessly transceiver;

a pallet control circuit communicatively coupled with the wireless transceiver and the first array of sensors, wherein the pallet control circuit is configured to receive sensor data from one or more sensors of the first array of sensors, generate a mapping of the multiple products and the placement of the multiple products relative to the first transport pallet as the multiple products are placed on the first transport pallet based on at least some of the image data of the sensor data and stored dimensions information regarding identified products being placed on the first transport pallet; determine a condition of one or more products of the multiple products at least as the multiple products are transported based on the sensor data, and cause condition information to be wirelessly transmitted to a separate notification system configured to provide notification to a worker regarding the condition of the one or more products; and a second array of sensors communicatively coupled with the pallet control circuit, wherein the first array of sensors is positioned to be under at least a first set of at least one product of the multiple products and providing sensor data corresponding to the first set of the multiple products, and the second array of sensors is positioned to be under at least a second set of at least one product of the multiple products and providing sensor data corresponding to the second set of the multiple products;

wherein the pallet control circuit is configured to further receive additional sensor data from one or more sensors of the second array of sensors, and determine a condition of one or more products of the second set of the multiple products based on the additional sensor data.

3. The system of claim 2, wherein the first array of sensors comprises a first casing with the sensors of the first array being cooperated in the first casing and collectively movable relative to the multiple products and the first transport pallet, and the second array of sensors comprises a second casing with the sensors of the second array being cooperated in a second casing and collectively movable relative to the multiple products and the first transport pallet.

4. The system of claim 1, wherein the pallet control circuit is temporarily and removably cooperated with the first transport pallet.

5. The system of claim 1, the pallet control circuit is configured to detect based on the sensor data a change in a quantity of the multiple products.

6. The system of claim 1, wherein the pallet control circuit, based on the sensor data, is configured to detect when the multiple products and first transport pallet are placed at an incorrect location for more than a threshold period of time, and to cause a notification to be wirelessly transmitted to the separate notification system.

7. The system of claim 1, further comprising:

an alert system cooperated with the first transport pallet and communicatively coupled with the pallet control circuit, wherein the pallet control circuit is configured detect a predefined condition based on the sensor data, to activate the alert system based on the detected predefined condition causing the alert system to generate at least one of a visual alert and an audible alert, detect a current state of surrounding conditions, and cause the alert system to modify the at least one of the visual alert and the audible alert based on the current state of the surrounding conditions.

8. A method of tracking palletized products, comprising:

receiving sensor data at a pallet control circuit of a first transport pallet and from a first array of sensors positioned relative to multiple products collectively arranged on the first transport pallet configured to support the multiple products while being transported such that the first array of sensors moves with the first transport pallet as the first transport pallet and the multiple products are transported, wherein the first array of sensors comprises at least an imaging sensor configured to capture the image data;

generating a mapping of the multiple products and the placement of the multiple products relative to the first transport pallet as the multiple products are placed on the first transport pallet based on at least some of the image data of the sensor data and stored dimensions information regarding identified products being placed on the first transport pallet;

determining a condition of one or more products of the multiple products at least as the multiple products are transported based on the sensor data; and causing condition information to be wirelessly transmitted to a separate notification system configured to provide notification to a worker regarding the condition of the one or more products;

wherein the receiving the sensor data from the first array of sensors comprises receiving the sensor data from a plurality of individual strips of sensors defining a grid and positioned to be under at least a first set of the multiple products supported by the first transport pallet.

9. A method of tracking palletized products, comprising:
receiving sensor data at a pallet control circuit of a first transport pallet and from a first array of sensors positioned relative to multiple products collectively arranged on the first transport pallet configured to support the multiple products while being transported such that the first array of sensors moves with the first transport pallet as the first transport pallet and the multiple products are transported, wherein the first array of sensors comprises at least an imaging sensor configured to capture the image data;
generating a mapping of the multiple products and the placement of the multiple products relative to the first transport pallet as the multiple products are placed on the first transport pallet based on at least some of the image data of the sensor data and stored dimensions information regarding identified products being placed on the first transport pallet;
determining a condition of one or more products of the multiple products at least as the multiple products are transported based on the sensor data;
causing condition information to be wirelessly transmitted to a separate notification system configured to provide notification to a worker regarding the condition of the one or more products;
receiving additional sensor data from a second array of sensors wherein the first array of sensors is positioned to be under at least a first set of at least one product of the multiple products and providing sensor data corresponding to the first set of the multiple products, and the second array of sensors is positioned to be under at least a second set of at least one product of the multiple products and providing sensor data corresponding to the second set of the multiple products; and
determining a condition of one or more products of the second set of the multiple products based on the additional sensor data.

10. The method of claim 9, further comprising:
directing a worker to position the first array of sensors, which comprises a first casing with the sensors of the first array of sensors cooperated in the first casing and collectively movable relative to the multiple products and the first transport pallet, under the first set of products; and
directing the worker to position the second array of sensors, which comprises a second casing with the sensors of the second array of sensors cooperated in the second casing and collectively movable relative to the multiple products and the first transport pallet, under the second set of products.

11. The method of claim 8, further comprising:
directing the temporary cooperation of the pallet control circuit with the first transport pallet such that the pallet control circuit is temporarily and removably cooperated with the first transport pallet.

12. The method of claim 8, further comprising:
detecting, based on the sensor data, a change in a quantity of the multiple products.

13. The method of claim 8, further comprising:
detecting, based on the sensor data, when the multiple products and first transport pallet are placed at an incorrect location for more than a threshold period of time; and
causing a notification to be wirelessly transmitted to the separate notification system.

14. The method of claim 8, further comprising:
detecting a predefined condition based on the sensor data;
activating an alert system cooperated with the first transport pallet and communicatively coupled with the pallet control circuit based on the detected predefined condition and causing the alert system to generate at least one of a visual alert and an audible alert;
detecting a current state of surrounding conditions; and
causing the alert system to modify the at least one of the visual alert and the audible alert based on the current state of the surrounding conditions.

15. The system of claim 1, wherein pallet control circuit is further configured to access a predefined mapping of predefined product placement on the first transport pallet and to confirm accuracy of the placement and stacking of the multiple products on the first transport pallet based on the predefined mapping and the generated mapping.

16. The system of claim 1, wherein the pallet control circuit in generating the mapping is further configured to define within the mapping the placement of at least two separate arrays of sensors, including the first array of sensors, relative to the positioning of different sets of products of the multiple products stacked on the first transport pallet.

17. The system of claim 3, wherein the first array of sensors is positioned with the stacked multiple products and comprises the imaging sensor and configured to capture the image data of at least one product of the multiple products as the at least one product is cooperated with the first transport pallet, and wherein the pallet control circuit is configured to receive image data from the imaging sensor of the at least one product, confirm an identification of the at least one product and confirm an orientation of the at least one product on the pallet based on the image data.

18. The system of claim 1, wherein the pallet control circuit is configured to receive additional image data captured by another imaging sensor of a separate array of sensors cooperated with a second transport pallet positioned proximate the first transport pallet, and determine product conditions of at least some of the multiple products cooperated with the first transport pallet based on the additional image data.

19. The system of claim 2, wherein the first array of sensors comprises a plurality of individual strips of sensors defining a grid and positioned to be under at least the first set of the multiple products supported by the first transport pallet.

20. The method of claim 9, wherein the receiving the sensor data from the first array of sensors comprises receiving the sensor data from a plurality of individual strips of sensors defining a grid and positioned to be under at least the first set of the multiple products supported by the first transport pallet.

* * * * *

UNITED STATES PATENT AND TRADEMARK OFFICE
CERTIFICATE OF CORRECTION

PATENT NO. : 10,347,095 B2
APPLICATION NO. : 15/792455
DATED : July 9, 2019
INVENTOR(S) : Todd D. Mattingly et al.

It is certified that error appears in the above-identified patent and that said Letters Patent is hereby corrected as shown below:

In the Claims

Column 20, Line 32, Claim 7, insert --to-- after "configured".

Signed and Sealed this
Fifth Day of November, 2019

Andrei Iancu
*Director of the United States Patent and Trademark Office*